Oct. 25, 1966 H. R. BRUET 3,280,649
ROTARY MOTION AND POWER TRANSMISSION BY ROTARY
MEMBERS SLIDABLY SPLINED OR KEYED ON A SHAFT
Filed June 9, 1964 2 Sheets-Sheet 1
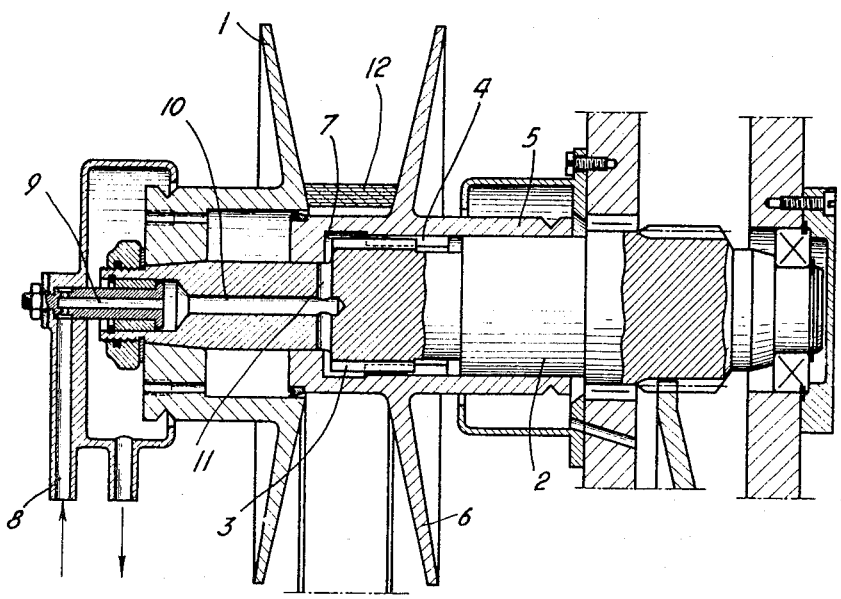
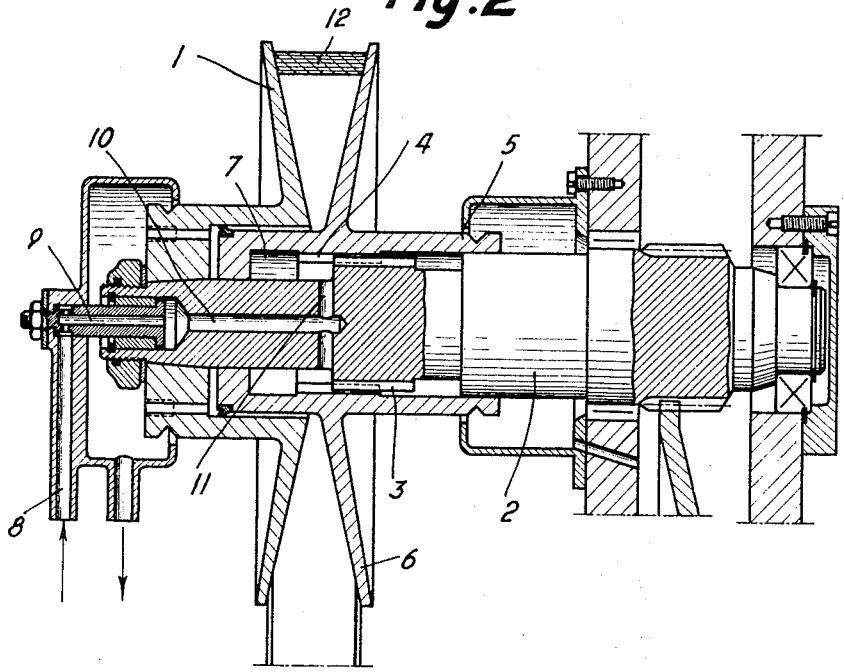

United States Patent Office 3,280,649
Patented Oct. 25, 1966

3,280,649
ROTARY MOTION AND POWER TRANSMISSION BY ROTARY MEMBERS SLIDABLY SPLINED OR KEYED ON A SHAFT
Henri Rene Bruet, Paris, France, assignor of one-half to Etablissements A. Cazeneuve, Seine, France, a French company
Filed June 9, 1964, Ser. No. 373,785
Claims priority, application France, June 10, 1963, 937,490, Patent 1,367,619
14 Claims. (Cl. 74—230.17)

The present invention relates to improvements in rotary motion and power transmission by rotary members slidably splined or keyed on a shaft, more particularly by pulleys of speed-changing mechanisms of the V-belt-drive type comprising pulleys with movable flanges, especially those mechanisms in which the displacement of the flanges or pulleys is carried out in the axial direction under hydraulic pressure.

In this type of device, the splines or keys by means of which the flanges of the pulleys are made fast for rotation with a shaft and permit the displacement of said flanges along said shaft are subjected to pressures which are variable and exerted in opposite directions, to shocks, to vibrational effects, all of which have a tendency to cause damage as a result of erosion or strain-hardening, all of which has a detrimental action on the smoothness and regularity of the rotary motion transmitted.

In order to avoid these drawbacks, and others, provision is made in accordance with the invention for driving and sliding splines or keys in such a manner that the grooves or keyways open into the pressure system of the driving liquid which controls the displacement of the pulley flanges or into any like medium which is maintained under either continuous or non-continuous pressure, whether in relation or not with the main hydraulic system. When the driving fluid is oil, this arrangement permits the creation of lubricating films of suitable density which are located between the sides of the grooves and their corresponding splines or between the keys and their supporting faces and accordingly facilitate the sliding movement and prevent strain-hardening and vibrations which said films tend to damp, with the result that the effective service life of the working parts will be increased and maintained over a very long period of use.

The complementary description which now follows and the accompanying drawings which are given solely by way of non-limitative example will serve to give a clear understanding of the arrangement according to the invention.

FIGS. 1 and 2 show two longitudinal cross-sections in two end positions of the receiving pulley of a progressive belt-driven speed-changing mechanism wherein the separation and drawing-together of the pulley flanges are effected hydraulically, for example by oil under pressure.

Figure 3:
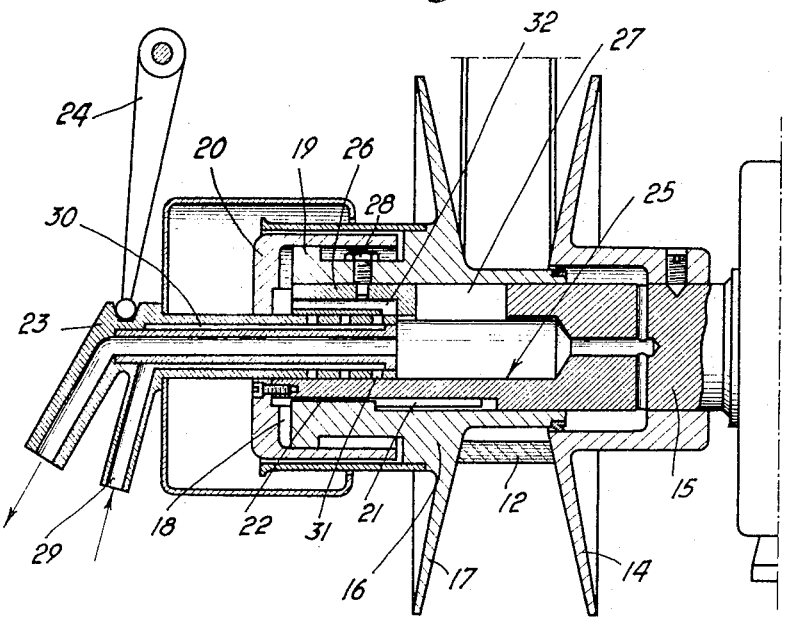
FIGS. 3 and 4, represent two longitudinal sectional views in two end positions of the driving pulley of a progressive belt-driven speed-changing mechanism wherein the separation and drawing-together of the pulley flanges are effected hydraulically, for example by oil under pressure.

Considered as a whole, these arrangements of driving pulleys and receiving pulleys are similar or analogous to those which are described in French Patent No. 1,168,880 as filed on March 6, 1957 under the title "Improvements in Driving Members of Machine Tools or the Like."

In consequence, the present description will be limited to one arrangement, given by way of example, of the driving and sliding splines and the action produced by these latter in the general system of receiving and driving pulleys of the progressive speed-changing mechanism of which they advantageously form a part.

There can be seen from FIGS. 1 and 2 the flange 1 which is coupled to the receiving shaft 2 in which are machined the grooves of the splines 3 in which are fitted the lands of the splines 4 which are machined on the hub 5 which carries the movable flange 6. Splines 3 and 4 thus provide keying means between shaft 2 and hub 5 and their grooves act as key holes. Between the receiving shaft 2 and the hub 5 is located the annular section 7 in which the front ends of the splines 3 and 4 have their openings. The oil under pressure which arrives through the tubes and passageways 8, 9, 10 and 11 enters through the annular surface 7, thrusts back the movable flange 6 from the position shown in FIG. 1 in which the minimum diameter is provided for the driving belt 12 to the position shown in FIG. 2 in which the maximum diameter is provided for said belt 12. The return from the position of FIG. 2 to the position of FIG. 1 is carried out by virtue of the pressure exerted on the flanges of the pulley by the driving belt 12 when this latter is drawn back as a result of the pressure applied thereto by the flanges of the driving pulley.

During these movements, a high pressure prevails within the annular section 7, with the result that the oil is driven back into the clearance which is necessarily allowed for the sliding motion of the lands within the grooves which have their openings in said annular section 7, with the result that there are thus formed oil films which tend to offer resistance to the pressures which result from the driving or braking action transmitted by the belt 12 and to damp in an advantageous and effective manner the vibrations which are liable to arise between the movable flange 1 and the receiving shaft 2.

Figure 4:
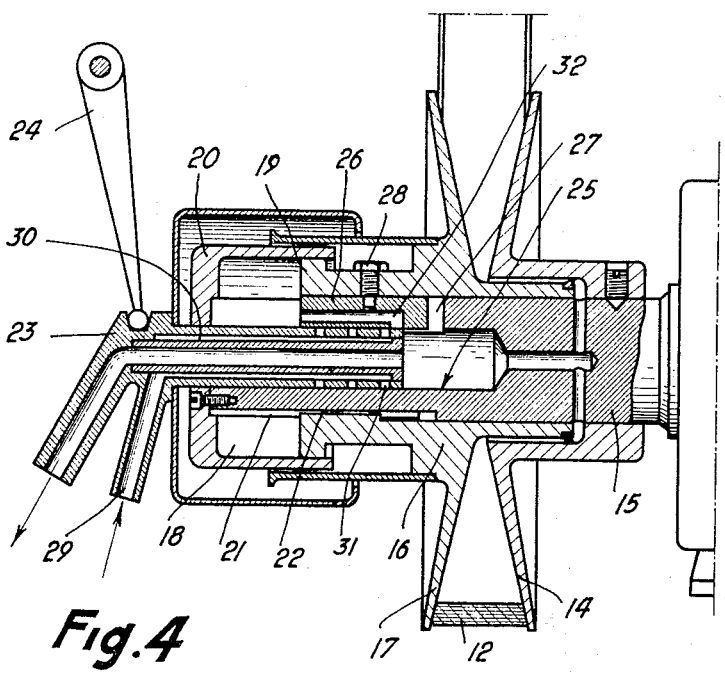

As appears from FIGS. 3 and 4, the driving pulley is composed of a flange 14 fixed on the driving shaft 15 on which is slidably mounted the cylindrical portion 16 of the flange 17 which forms at the front end an annular piston 19 which is adapted to move within the annular chamber 18, said chamber being delimited by the driving shaft 15 and the cylinder 20 which is centered and fixed on the extremity of said piston. The driving shaft 15 is provided with grooves 21 in which are fitted the lands of the splines 22 which are formed in the cylindrical portion 16 of the flange 17. The distributor 23 which is controlled by the lever 24 is adapted to slide within the base of the cylinder 20 and within a bore 25 which is provided for this purpose within the driving shaft 15. A slide-valve 26 is fitted with suitable play in a groove 27 formed in the driving shaft 15. Said slide-valve 26 is made integral with the cylindrical portion 16 of the flange 17 by means of a screw 28 and takes part in all the displacements of the flange 17.

The oil under pressure is admitted through the passageways and ports 29, 30, 31 and 32 into the annular space 18 and exerts a pressure on the annular piston 19 which is thus displaced together with the flange 17 according to the position of the lever 24 by virtue of the controlling action produced by the distributor 23 and the slide-valve 26. As shown in FIGS. 1 and 2, the said oil under pressure infiltrates in the clearance which is necessarily provided between the grooves and splines so as to permit the sliding motion of these latter and to form oil films which provide resistance to the pressures produced by the driving and braking action transmitted by the belt 12 so as to effectively damp the vibrations which are liable to occur between the movable flange 17 and the driving shaft 15.

By virtue of the arrangements described above, the driving shaft 15 will be endowed with more effective control over the receiving shaft 2, which has a considerable importance in the case of machine tools in which the machining work is thus improved. Moreover, the driving and sliding splines or keys will be maintained in good condition over a longer period of service and under better operating conditions.

It should be noted in particular that the application of the invention to the receiving pulley of a speed-changing unit is of special interest since it is in this case that vibrations occur to a maximum extent.

Other similar or analogous arrangements could be carried into effect in accordance with the present invention. It would be possible, for example, to provide for the infiltration of oil under pressure between the driving and sliding grooves and splines through a pressure system which could consist either of a by-pass or diversion of driving oil taken from the main circulation system or of a separate and self-contained circulation system which is specially designed or arranged for the purpose of obtaining the effects described above.

It will be understood that the invention is not limited to the example which has been given above by way of example but includes within its scope all similar or analogous devices comprising either all or a part of the elements which constitute said invention, and that it covers all mechanisms which entail either one or a number or all of the arrangements substantially as hereinbefore described and for all practical uses, particularly insofar as it constitutes a novel industrial product.

What I claim is:

1. In a rotary motion and power transmitting contrivance including a shaft, a rotary drive member and keying means slidably keying said member on said shaft, vibrations damping means combined with said member and including separate chambers provided on each side of said member and fully filled with liquid, said keying means including at least one key hole in the shaft, the remote ends of said key hole communicating with said chambers respectively.

2. In a transmitting contrivance as in claim 1, the liquid in said chambers being a liquid under pressure.

3. In a transmitting contrivance as in claim 1, at least one of said chambers being closed.

4. In a transmitting contrivance as in claim 1, means supplying liquid under pressure connected to at least one of said chambers to fill it up with said liquid.

5. In a transmitting contrivance as in claim 4, at least one said chambers being branched off said liquid supplying means.

6. In a transmitting contrivance as in claim 5, said chamber being so branched off said liquid supplying means as to provide a by-pass.

7. In a transmitting contrivance as in claim 4 both chambers being serially connected in said liquid supplying means.

8. In a transmitting contrivance as in claim 1, said rotary drive member being a belt pulley.

9. In a speed changing contrivance including a shaft, a V-belt pulley sheave part having a hub, keying means slidably keying said hub on said shaft, a chamber provided between said hub and shaft at one end of said keying means, the latter having at least one key hole in communication with said chamber, a further chamber provided within said hub at the other end of said keying means, and means for supplying a liquid under pressure into said latter chamber.

10. In a speed changing contrivance as in claim 9, said chamber between hub and shaft otherwise being closed.

11. In a speed changing contrivance as in claim 9, said pulley sheave part being that of the belt driven pulley of the contrivance.

12. In a speed changing contrivance as in claim 9, said hub being internally provided with a local annular shoulder and said keying means including splines cut in said shoulder on one and the other side of which said chambers are provided respectively.

13. In a speed changing contrivance as in claim 9, said hub being extended axially on one and the other side of the belt engaging sheave part, the pulley having a second sheave part provided with a hub having a bottom fluid tightly fastened to a part of reduced diameter of said shaft so that diameter of said shaft part is less than the inner diameter of said latter hub fast with the shaft, and said slidable hub on the side of the belt engaging face of the sheave part being in slidable engagement with both said shaft part of reduced diameter and with said hub fast thereon.

14. In a speed changing contrivance as in claim 13, means carried by said slidable hub and whereby its slidable engagement with the fast hub is made fluid tight.

References Cited by the Examiner
UNITED STATES PATENTS

| 2,779,203 | 1/1957 | Eubanks | 74—230.17 |
| 3,081,642 | 3/1963 | Emerson | 74—230.17 |

DAVID J. WILLIAMOWSKY, *Primary Examiner.*

L. H. GERIN, *Assistant Examiner.*